United States Patent

[11] 3,601,975

| | | |
|---|---|---|
| [72] | Inventor | Paul Wuthrich<br>Woodbury, Conn. |
| [21] | Appl. No. | 818,628 |
| [22] | Filed | Apr. 23, 1969 |
| [45] | Patented | Aug. 31, 1971 |
| [73] | Assignee | Timex Corporation |

[54] HOROLOGICAL MOVEMENT UTILIZING A RADIOACTIVITY DETECTOR AND SOURCE
2 Claims, 5 Drawing Figs.

[52] U.S. Cl. ................................................... 58/28,
318/127
[51] Int. Cl. ................................................... G04c 3/04
[50] Field of Search ........................................... 58/23, 23 T,
28, 28 A, 28 B, 28 D; 310/36; 318/127, 129

[56] References Cited
UNITED STATES PATENTS
3,335,561  8/1967  Kurosawa .................... 58/28

FOREIGN PATENTS

| 332,565 | 9/1958 | Switzerland ................. | 58/28 A |
| 1,064,430 | 8/1959 | Germany ...................... | 58/28 A |
| 1,200,019 | 12/1959 | France ......................... | 58/28 |

Primary Examiner—Richard B. Wilkinson
Assistant Examiner—Edith C. Simmons
Attorney—Richard A. Joel ABSTRACT: A horological instrument includes an oscillating member as its time base. The oscillator, for example, a balance wheel, carries a radioactive source. The path of movement of the radioactive source is within the range of a radiation detector fixed to the base of the instrument. The radiation detector controls an electronic switch which is connected to a power source and provides an impulse to a coil. The coil provides a driving impulse to the oscillator.

PATENTED AUG 31 1971　　　　　　　　　3,601,975
FIG. 1
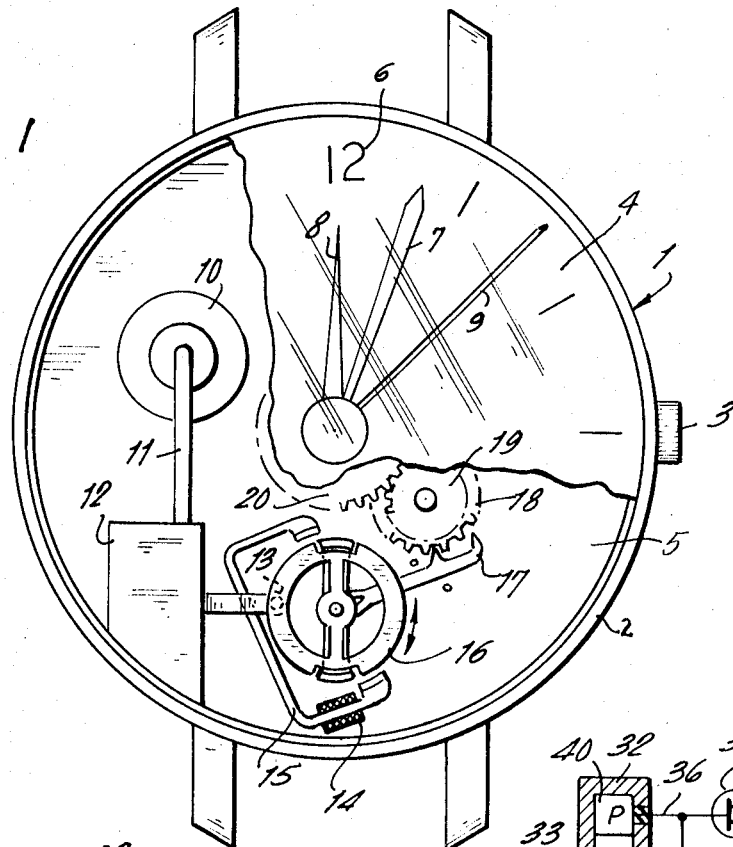
FIG. 2
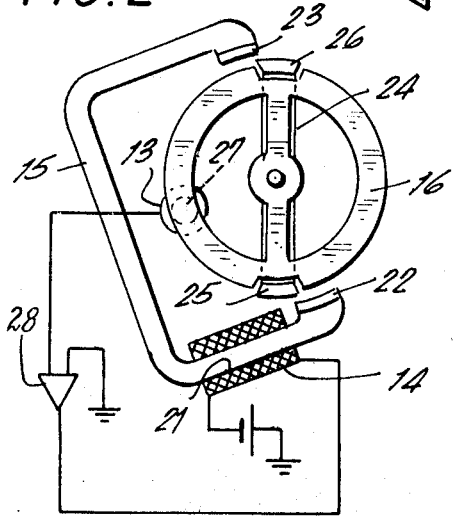
FIG. 4
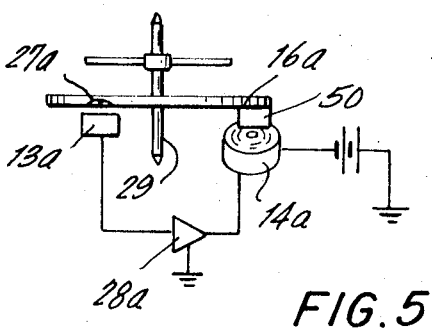
FIG. 3
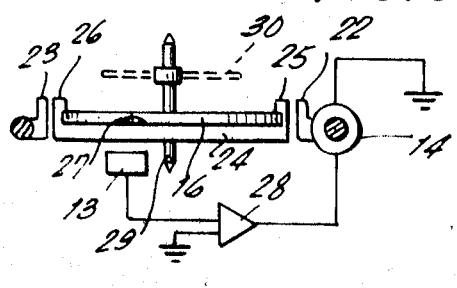
FIG. 5
INVENTOR.
PAUL WUTHRICH
BY
Davis, Hoxie, Faithfull & Hapgood
ATTORNEYS 3,601,975

HOROLOGICAL MOVEMENT UTILIZING A RADIOACTIVITY DETECTOR AND SOURCE

DESCRIPTION

The present invention relates to horology and more particularly to an electronic horological mechanism.

At the present time there are various types of electronic watch movements which are being sold. Such movements utilize an oscillating member, for example, a balance wheel, as their time base. Generally, these movements fall into two categories. The first type uses a balance wheel carrying one or more magnets or soft iron pieces. The balance wheel acts as the armature of the motor and cooperates with one or more coils which are fixed to the base. Alternatively, one or more coils may be carried by the balance wheel and the magnets or other coils may be fixed to the base. In both of these types of movements, it is necessary for the coils to be periodically impulsed with current from the battery within the case of the instrument. It has been proposed that the timing of the drive impulse should be obtained from a separate time base, for example, from a piezoelectric crystal or a resistor-capacitor network. However, the instruments which have been marketed have relied upon the motion of the oscillator to provide the timing for the impulse. For example, in one type of watch the balance wheel carries two pairs of magnets which serve two functions—first, to drive the balance wheel and, secondly, to induce a back electromotive force in a pickup coil. The pickup coil provides the control to an electronic switch which, in turn, controls the impulse of the driving coil.

In a watch, if one or more magnets are attached to the balance wheel, considerable difficulties are presented in shielding. The magnets swing around the axis of the balance wheel staff and present a varying magnetic field throughout the area of the balance wheel. This varying magnetic field may be detrimental to the correct operation of the hairspring and other portions of the watch mechanism. On the other hand, the alternative construction, using a coil carried by the balance wheel, also presents difficulties. Such a coil may be more expensive, because of the poising of the balance wheel and the connection of the coil by two hairsprings, than is a coil fixed to the watch base.

It is the objective of the present invention to provide a watch mechanism in which the oscillator does not provide a varying magnetic field and in which the oscillator utilizes a single hairspring.

It is a further objective of the present invention to provide a watch mechanism which is relatively inexpensive, sturdy, and long-lasting.

In accordance with the present invention, a watch mechanism is provided in which the time base is an oscillator. The oscillator, for example, the balance wheel, comprises a metal or plastic rim member mounted by spokes to a balance wheel staff. A soft iron armature is connected to, and is part of, the balance wheel. A dot of radioactive material is applied at a predetermined position on the rim of the balance wheel. Two pole pieces are fixed to the base and positioned so that each pole forms a small air gap relative to the soft iron armature of the balance wheel.

A coil, consisting of many turns of fine wire, is positioned around a magnetic conductive core member connecting the pole pieces. One end of the coil is connected to the energy cell (battery) and its other end is connected to an electronic switch. The electronic switch, which may be a solid-state transistor circuit, is also connected to the energy cell. The electronic switch is controlled by a radiation detector positioned on the base and near the path of the radioactive source. Upon oscillation of the balance wheel, the radioactive source approaches closely to the radiation detector, activating the detector. The detector, in turn, causes a sufficient voltage to the electronic switch to close the circuit and permit current to flow from the energy cell through the coil. The pulse to the coil causes a drive impulse to the armature.

Other objectives of the present invention will be apparent from the following detailed description of the invention giving the inventor's best mode for carrying the invention into effect, which detailed description is taken in conjunction with the accompanying drawings.

In the drawings:

FIG. 1 is a top plan view of the watch of the present invention with a portion of its dial broken away to show its internal mechanism;

FIG. 2 is an enlarged top plan view of the balance wheel of the watch and its associated mechanism;

FIG. 3 is a side view of the mechanism shown in FIG. 2;

FIG. 4 is a circuit diagram of the circuit of the present invention; and

FIG. 5 is a side plan view of an alternative embodiment of the present invention, the view being similar to that in FIG. 3 but with the coil shown in perspective and interacting with a permanent magnet on the balance wheel As shown in FIG. 1, the horological mechanism of the present invention is illustrated in connection with a wrist watch, although its principles are also applicable to clocks and other horological instruments.

The wrist watch includes a case 1 having a bezel portion 2. The watch has a crystal 4 of glass or transparent plastic and a dial 5 having time indicating numerals on its face. The watch, as in conventional movements has time indicating means consisting of a second hand 9, a minutes hand 7, and an hour hand 8. The hands are set by means of a rotatable crown 3.

The power for driving the watch is obtained from a small energy cell (dry battery) 10, although other sources of energy may be used, such as photocells or rechargeable cells. The cell 10 is connected, by spring contact strip 11, to a circuit block 12. The circuit block 12 is connected to a radiation detector 13 and a driving coil 14. The driving coil 14 is wound about a core 15. The poles of the core 15 (the stator) impulse a balance wheel assembly (the armature). The balance wheel 16 has a plateau carrying a pin which oscillates a fork 17 between its banking pins. Pins on the end of the fork 17 index an index wheel 18. An index wheel pinion 19, fixed to the same staff as the index wheel 18, meshes with a second wheel 20 which is connected with the seconds hand 9 by means of a staff. The second wheel 20, as in conventional watch movements, drives the other gears of the movement and thereby rotates the minutes hand 7 and the hour hand 8.

As shown in FIGS. 2 and 3, the coil 14 is a cylindrical member wound of many turns of fine wire. The coil 14 has a bore 21 through which the arm of the stator core 15 is inserted. The stator core 15 is made of high permeability material, for example, of soft iron. The core 15 terminates in a first pole piece 22 and an opposite second pole piece 23, which are positioned 180° apart relative to the balance wheel 16.

An armature, having end portions 25 and 26, is fixed to the balance wheel 16. The armature, which may be, for example, soft iron, cooperates with the pole pieces 22 and 23. When the coil 21 receives an impulse, it induces a magnetic force in the core 15 which is transmitted to the pole pieces. The pole pieces, when so temporarily magnetized, attract the soft iron armature ends 25 and 26, as the magnetic field is attempted to be closed by the armature acting as a shunt to the pole pieces. This attractive force imparts a driving impulse to the balance wheel.

The balance wheel 16 carries a spot 27 radioactive material on its rim. That spot 27 may be detected by means of radiation detector 13. The radiation detector controls the electronic switch 28. As in conventional movements, the balance wheel 16 is mounted on a balance wheel staff 29 and has a hairspring 30 terminating in its inner end in a hairspring hub terminating at its outer end in a frame or bridge portion of the movement.

In the drawing of FIG. 4, the radiation detector 13 includes a photosensitive phototransistor 40 which is optically coupled to a scintillation material 41 in a light-tight case 32. The case 32 is preferably of a radiation resistant material, such as lead, except at its open face 33. Face 33 is covered with a light-tight but radiation penetrable material 34. The case 32 reduces the adverse effects of random radiation, for example, cosmic rays.

The battery 10 is connected to a first lead 35 of the phototransistor 40, its second lead 36 being connected to resistor 37. The switching circuit includes PNP transistor 38 which has its collector 39 connected to one end of coil 14 and its emitter to the positive terminal of battery 10. The opposite end of coil 11 is connected, by line 42, to the negative terminal of battery 10.

In an alternative construction, shown in FIG. 5, the coil 14a is positioned beneath the path of the balance wheel 16a. The balance wheel 16a carries a permanent magnet 50 which is axially magnetized, i.e., in a direction parallel to the balance wheel staff. As in the previous embodiment, the presence of the radioactive source 27a activates the radiation detector 13a, which controls the electronic switch 28a. A pulse to coil 14a is triggered by detector 13a when magnet 50 is over the coil 14a. The coil 14a impulses the magnet, either attracting or repelling it, depending upon its polarity. The other portions of the watch mechanism are the same as in the previous embodiment.

It is vital that the radioactive material not present a health hazard. A watch is worn next to the skin, so that any radiation emitting from the back of the watch case would present a hazard. Such a hazard may be prevented, for example, in the following ways: (1) utilizing such a low level of activity that, even prolonged exposure to a small area of the wrist, will not result in injury; (2) mounting the material on top of the balance wheel toward the dial. The position would be in a direction so that its radiation toward the wrist would be mainly blocked or absorbed by the balance wheel rim; (3) utilizing the proper form of radiation, alpha or low-energy beta, so that the watch case would shield all the radiation and prevent its emittance; and (4) using very little radioactive material and a highly sensitive detector.

A dose of alpha particles is about 20 times as dangerous as gamma rays, even if their energy releases are identical. This difference arises from the mechanism of interaction of the particle and the body cell. The equivalent X-ray or gamma does of 0.1 r.e.p./week, which is close to the maximum permissible does, is 0.015 for alpha particles. The respective equivalent flux is about 420 — (one third mev.) cm.$^2$-sec. and 0.0005 (one third mev.)/cm.$^2$-sec. However, alpha and low-energy beta radiation may be more easily shielded than gamma radiation.

A suitable radioactive material may be Radium 226 having a half-life of 1620 years and alpha radiation of 4.8 mev. Alpha, and low-energy beta, radiation would be completely shielded by the thickness of metal used in the ordinary watch case.

The radiation detector should have certain properties. It should consume very little power, as the battery in a watch is small. Preferably its standby power consumption, when the radiation material is outside of the range of the detector, should be extremely small or nil. The detector should operate at the low voltage of 1–2 volts available from the battery in the watch case. With such low voltages, one may not use a gas ionization detector such as a Geiger-Muller tube, or even a sensitive light detector such as a photomultiplier.

Preferably, the radiation detector utilizes a scintillation counter. The radiation interacts with the material of the counter. The materials may be in liquid form, the material, for example, being phosphor zinc sulfide, anthracene or sheelite. The material exhibits a flash of light which is detected by a sensitive photocell. Preferably the photocell is a phototransistor, so that is power requirement is low.

I claim:

1. In a horological instrument comprising a case and time indicating means, a driving system for the time indicating means including:
    a base;
    an oscillating member fixed to the base so that it may oscillate;
    an armature mounted on the oscillating member;
    a radioactive source carried at one point on the oscillating member;
    a core having an end portion defining a pole, said pole being positioned with relation to the armature so that an air gap is defined between the pole and the armature;
    a coil having first and second terminals and consisting of a plurality of wire turns positioned around the core;
    an energy cell connected to the first terminal of the coil;
    an electronic switch connected to the second terminal of the coil; and
    a radiation detector positioned on the base and near the path of the radioactive source, said detector controlling the switch and said detector comprising a scintillation counter and a solid-state photoresponsive component optically coupled thereto.

2. In a horological instrument comprising a case and time indicating means, a driving system for the time indicating means including:
    a base;
    an oscillating member fixed to the base so that it may oscillate;
    a magnetic means mounted on the oscillating member;
    a radioactive source carried at one point on the oscillating member;
    a coil having first and second terminals and consisting of a plurality of wire turns, said coil being fixed to said base and proximate the path of the said magnetic means;
    an energy cell connected to the first terminal of the coil;
    an electronic switch connected to the second terminal of the coil; and
    a radiation detector positioned on the base and near the path of the radioactive source, said detector controlling the switch and said detector comprising a scintillation counter and a solid-state photoresponsive component optically coupled thereto.